May 31, 1966 G. L. TRAVERS 3,253,639
PNEUMATIC TIRE CASINGS WITH REINFORCED BEADS
Filed July 29, 1964
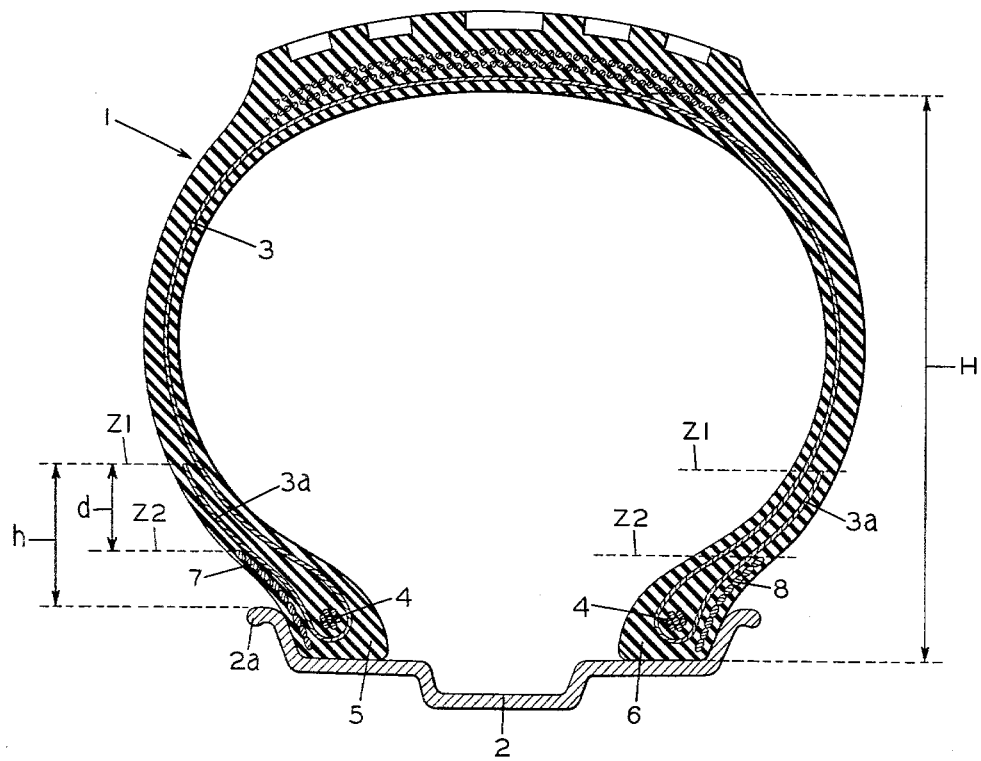
FIG.I.
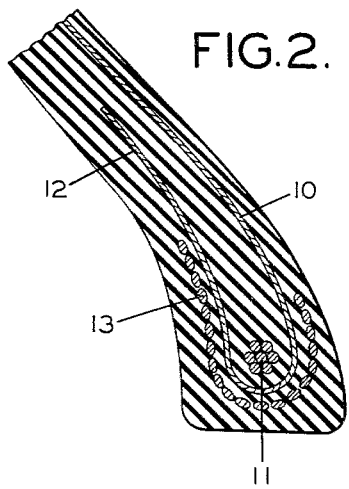
FIG.2.
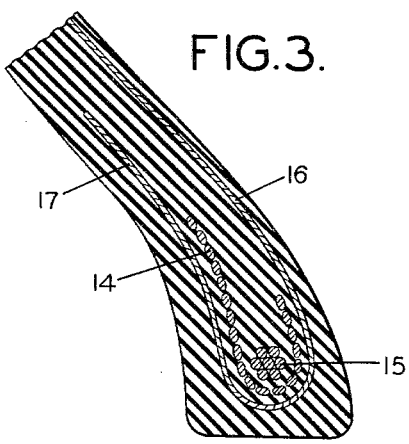
FIG.3.
INVENTOR
GEORGES LOUIS TRAVERS
BY
Brewbaugh, Free, Graves & Donohue
HIS ATTORNEYS

United States Patent Office 3,253,639
Patented May 31, 1966

3,253,639
PNEUMATIC TIRE CASINGS WITH REINFORCED BEADS
Georges Louis Travers, Chibret, Clermont-Ferrand, France, assignor to Compagnie Generale des Etablissements Michelin, raison sociale Michelin & Cie, Clermont-Ferrand, France
Filed July 29, 1964, Ser. No. 386,000
Claims priority, application France, Aug. 1, 1963, 943,403
2 Claims. (Cl. 152—362)

This invention relates to improvements in pneumatic tire casings of the tubeless and tube-containing types and it relates particularly to tire casings having improved bead reinforcements for reducing tire failure in the sides thereof adjacent to the beads resulting from stresses developed by the operation of vehicles equipped with the tire casings.

Failure of or damage to tires in the sidewalls adjacent to the rim-engaging beads, under severe operating conditions, are so well known that many attempts have been made in the past to reinforce the beads and the portions of the sides of the tire casing adjacent to the beads. Usually, the edge portions of the carcass plies are wrapped around the bead cables or wires and extend beyond the bead area into the sides of the casing. In addition, bias laid plies of cords are included in the beads and extend upwardly along the sides of the tire. These prior constructions have not been wholly satisfactory, particularly in the larger heavy-duty tire casings which are subjected to very severe operating conditions.

Because of the tendency of the tire casings to fail or be damaged in the sides adjacent the bead area, I have conducted research to determine the cause of such tire failure. On the basis of my research, I have determined that a contributing factor is the internal shearing stress exerted on the rubber of the tire casing resulting from deformation and displacement of the cords in the carcass and the turned back portions thereof and the reinforcing bias-laid plies in the beads. In tire casings containing radially extending cords formed of natural fibers, synthetic fiber, metallic wires, glass fibers and the like, it is found that two types of deformations, i.e., radial and circumferential deformations resulting in shearing stresses are produced by the normal operation of the tire. Radial deformations, i.e., radial flexing of the casing results in two somewhat different types of deformations in a radial direction. The first result of flexing of the tire casing under load is to force the radial wires of the casing to move apart because of the change in the profile of the side or sidewall of the tire. This separation of the carcass cords is relatively small or negligible in the beads but is greater in the inflated area of the casing and particularly about half way up the sidewall of the tire. It has been found that in the area where cord separation is considerable, it is advantageous not to include any plies or reinforcing elements which impede the separation of the radial cords and produce shearing stresses in the rubber or other elastomer of the tire casing.

In the prior casings, the bias-laid reinforcing plies in the bead extend upwardly into the area of substantial flexing of the casings and consequently resist separation of the radial cords thereby subjecting the rubber between the plies to very high shearing stresses.

A second action resulting from flexing of the casing in operation is an endwise displacement of the radial cords in the meridian or radial plane. This displacement produces shearing stresses in the rubber for the reason that the radial cords of the carcass and their turned back ends have a tendency to slide around the bead wire and thus in opposite directions. My research has confirmed this action in tire casings having radial plies. Also, it has been confirmed that circumferential deformations create severe shearing stresses in the areas where the bias-laid bead reinforcing plies overlap the radial cords.

In accordance with the present invention, tires are provided having radially extending cords in the carcass of the tire which are wrapped (turned back) around the bead wires and extend only to a zone where radial deformations of the tire casing are small, and bias-laid plies which extend less far into the sidewalls than turned back cords and are likewise restricted to the zone where radial and circumferential deformations are low.

More particularly, in accordance with the invention, the turned back portion of the radial cord ply is limited to an area in the sides of the casing adjacent to the bead which does not substantially exceed one-third of the interior height of the tire, and the bias-laid bead reinforcing plies are limited to an area of about one-third to one-half of the distance between the edge of the turned back portion of the radial ply and the outer edge of the rim flange on the wheel on which the tire is mounted. By so limiting the areas of overlap of the turned back portions of the radial plies and the bias-laid plies, their edges are kept out of the zone or zones of maximum flexing so that the stress producing effects noted above are largely eliminated. In this regard, the major portion of the flexing of the tire in service occurs in about the outer half of the tire while flexing adjacent the rim is far less severe.

In practical embodiments of tire casings embodying the present invention, the extent of the turned back portion of the radial carcass plies measured from the top of the rim flange of a vehicle wheel is between about 0.08 and 0.25 the height of the inside cross-section of the tire. A preferred satisfactory distance is about 0.15 the height of the inside section of the tire. The heighth of the outermost edge of the bias-laid reinforcing ply is between about one-third and one-half of the distance between the outer edge of the turned back portion of the radial ply and the outer edge of the rim flange. With these dimensions, minimum interference with flexing of the tire and minimum development of stresses in the rubber between the plies as well as adequate reinforcement of the bead area are obtained.

For a better understanding of the present invention, reference may be had to the accompanying drawings, in which FIGURE 1 is a view in cross-section through a portion of the tire embodying the present invention shown mounted on the rim of a vehicle of a tire;

FIGURE 2 is a view in cross-section through a bead of a tire embodying the present invention showing a modified reinforcement therefor; and FIGURE 3 is a view in cross-section through a bead of a tire embodying the present invention showing another modification of the reinforcement thereof.

A typical tire in accordance with the invention is illustrated in FIGURE 1. The tire casing 1 is illustrated as mounted on a wheel rim 2 of conventional type having fixed rim flanges 2a. The casings can be used with other types of rims including those having demountable rim flanges. A carcass ply 3 of radial cords for example, metallic cables, reinforces the sides and tread zone of the tire and extends downwardly around the bead wires 4 and upwardly along the sides of the casing. As shown, the turned back edge portion 3a of the ply 3 of cords extends upwardly into a zone of generally constant curvature of the tire 1, that is, a zone where the curvature or profile of the tire is not greatly altered by the loads applied thereto. In addition, each of the beads 5 and 6 of the tire casing is reinforced by means of a ply 7 and 8 composed of obliquely laid or bias-laid cords disposed outside the turned back portion 3a of the carcass ply.

In accordance with the invention, the location of the outer edges of the portions 3a and the bias-laid plies 7 and 8 are closely controlled to obtain maximum benefits in respect to resistance to failure of the tire in the area adjacent the beads. To that end, the edge of the turned portion 3a of the carcass ply 3 has a height $h$ above the rim flange 2a between about 0.08 and 0.25 of the height $H$ of the inside dimension of the tire casing under no load conditions. The bias-laid reinforcing plies 7 and 8 extend outwardly a lesser distance than the plies 3a so that the distance $d$ indicated in FIGURE 1 is at least equal to half and is preferably two-thirds of the distance $h$. With relation to the overall extent of the portions 3a and the plies 7 and 8 in the sidewall, the distance between the line Z1 and the inner edge of the bead 6, for example, is between one-ninth and one-third of the inside dimension $H$ of the tire casing. In the tire illustrated in FIG. 1 having an internal dimension $H$ of, for example, 7.50 inches, the distance $h$ is about 1⅞ inches (0.25H) and the distance $d$ is one inch. The distance between the inner edge of the bead 6 and the line Z1 is about 2½ inches and the distance between the edge of the bias-laid ply 8 indicated by the line Z2 and the inner edge of the bead 6 is about 1½ inches. The height of the rim flanges 2a is approximately ⅝ inch.

Inasmuch as the overlap of the carcass ply 3 and the folded back portion 3a thereof is in about the inner one-third of the area of the side of the tire, the overlap is disposed in a zone where flexing of the tire during operation is relatively small and as a consequence the radial deformations tending to subject the rubber of the sidewall to shearing stresses are relatively small. Also, the presence of the bias laid plies 7 and 8 is restricted to an area immediately adjacent the beads 5 and 6 of the tire where both circumferential and radial deformations are small and consequently shearing stresses in the circumferential direction as well as in a radial direction are relatively small and hence do not cause ply separation and damage to the tire.

Other modifications of the arrangement of the carcass plies and the turned back edge portions thereof as well as of the bias laid bead reinforcing plies are possible, as illustrated in FIGURES 2 and 3. As shown in FIGURE 2, the carcass ply 10 of radial cords extends around the bead wire 11 and has its edge portion 12 turned back generally into parallel relation to the adjacent portion of the carcass ply. The bias laid cords 13 extend around the bead wire 11 inside the carcass ply 10 and outside its edge portion 12, the dimensional relations of these plies being the same as those described in connection with FIGURE 1.

The bead reinforcement shown in FIGURE 3 differs from that shown in FIGURE 2 in that the ply of bias laid cords 14 is disposed between the bead wire 15, the carcass ply 16 and its turned back edge portion 17. As shown in FIGURES 2 and 3, the edge of the bias laid cord ply 13 or 14 adjacent to the inside of the casing does not extend into the side-wall of the casing as far as the edge on this ply 13 or 14 adjacent to the outside of the casing.

From the preceding description, it will be apparent that the above-described embodiments of the invention provide adequate bead reinforcement but do not extend sufficiently far into the portion of the tire casing which undergoes flexing or overlap to such an extent as to cause severe shearing stresses to be developed which would result in ply separation and damage to the tire casing in the sidewall areas adjacent to the beads.

It will be understood that modifications other than those illustrated in the drawings can be made in the arrangements of the plies in and adjacent to the bead zone and without departing from the invention. Accordingly, the forms of the invention disclosed herein should be considered as illustrative and the invention is limited only as defined in the following claims.

I claim:

1. A pneumatic tire casing having a tread, sidewalls extending inwardly from opposite edges of said tread and beads containing bead wires at inner edges of said sidewalls, the combination therewith of a carcass ply of substantially radial cords in each sidewall and extending from at least the adjacent edges of said tread through each sidewall into the bead at its inner edge, said carcass ply having an edge portion wrapped around the bead wire in a bead and extending into said sidewall and having an edge terminating a distance from the inner edge of said bead between about one-third and one-ninth the interior height of the tire casing when the latter is free of load and in an area in the sidewall where the curvature of the sidewall remains substantially constant under load, and a bead reinforcing ply of angularly inclined cords in said bead and extending into the adjacent sidewall a distance substantially less than said edge of said carcass ply and having an edge spaced from the edge of said carcass ply a distance not exceeding about one-sixth the inside height of the tire.

2. A pneumatic tire casing having a tread, sidewalls extending inwardly from opposite edges of said tread and beads containing bead wires at inner edges of said sidewalls, the combination therewith of a carcass ply of substantially radial cords in each sidewall and extending from at least the adjacent edges of said tread through each sidewall into the bead at its inner edge, said carcass ply having an edge portion wrapped around the bead wire in a bead and extending into said sidewall and having an edge terminating a distance from the outer edge of a rim for mounting said tire of about 0.15 of the inside height of said tire casing and in an area in the sidewal where the curvature of the sidewall remains substantially constant under load, and a bead reinforcing ply of angularly inclined cords in said bead and extending into the adjacent sidewall a distance less than said edge of said carcass ply.

References Cited by the Examiner

UNITED STATES PATENTS 3,115,179 12/1963 Shepherd _____ 152—354

FOREIGN PATENTS 521,641 8/1953 Belgium.
1,253,397 12/1959 France.

ARTHUR L. LA POINT, *Primary Examiner.*

C. W. HAEFELE, *Assistant Examiner.*